(12) United States Patent
Bowers et al.

(10) Patent No.: US 8,715,496 B2
(45) Date of Patent: *May 6, 2014

(54) WATER ALTERATION STRUCTURE AND SYSTEM HAVING BELOW SURFACE VALVES OR WAVE REFLECTORS

(75) Inventors: Jeffrey A. Bowers, Kirkland, WA (US); Kenneth G. Caldeira, Campbell, CA (US); Alistair K. Chan, Stillwater, MN (US); William H. Gates, III, Redmond, WA (US); Roderick A. Hyde, Redmond, WA (US); Muriel Y. Ishikawa, Livermore, CA (US); Jordin T. Kare, Seattle, WA (US); John Latham, Boulder, CO (US); Nathan P. Myhrvold, Medina, WA (US); Stephen H. Salter, Edinburgh (GB); Clarence T. Tegreene, Bellevue, WA (US); Willard H. Wattenburg, Walnut Creek, CA (US); Lowell L. Wood, Jr., Bellevue, WA (US); Victoria Y. H. Wood, Livermore, CA (US)

(73) Assignee: The Invention Science Fund I LLC

( * ) Notice: Subject to any disclaimer, the term of this patent is extended or adjusted under 35 U.S.C. 154(b) by 1225 days.

This patent is subject to a terminal disclaimer.

(21) Appl. No.: 12/012,225

(22) Filed: Jan. 30, 2008

(65) Prior Publication Data

US 2009/0173801 A1 Jul. 9, 2009

Related U.S. Application Data

(63) Continuation-in-part of application No. 12/006,804, filed on Jan. 3, 2008, and a continuation-in-part of application No. 12/006,805, filed on Jan. 3, 2008, and a continuation-in-part of application No. 12/006,815, filed on Jan. 3, 2008, and a continuation-in-part of application No. 12/006,823, filed on Jan. 3, 2008.

(51) Int. Cl.
*B01D 17/00* (2006.01)
*E02B 9/08* (2006.01)
*F04B 17/00* (2006.01)

(52) U.S. Cl.
USPC .................. 210/170.11; 60/641.7; 210/242.1; 290/42; 290/53; 405/76; 405/79; 417/331; 417/334

(58) Field of Classification Search
USPC ........ 60/641.6, 641.7, 398; 210/97, 121, 123, 210/136, 137, 143, 170.11, 242.1, 601, 610, 210/747, 774, 747.5, 747.6; 239/2.1, 14.1; 114/144 R, 244, 264–267, 382; 440/1, 440/2, 8–10; 441/1–3; 417/53, 60, 330, 417/331, 334; 405/21, 36, 37, 52, 80, 95.1, 405/303, 35, 76, 77–79; 261/121, 123; 290/52, 42, 53
See application file for complete search history.

(56) References Cited

U.S. PATENT DOCUMENTS

| | | | |
|---|---|---|---|
| 1,513,874 | A | 11/1924 | Ufford |
| 3,276,213 | A | 10/1966 | Soesan |

(Continued)

FOREIGN PATENT DOCUMENTS

| | | |
|---|---|---|
| CN | 1566916 (A) | 1/2005 |
| GB | 2 337 749 A | 12/1999 |

(Continued)

OTHER PUBLICATIONS

Anomalies-Unlimited; "Dyn-O-Gel Water Absorbing Polymer—Dyn-O-Mat Promises Clear Skies—New Storm-Fighting Product Dissipates Clouds"; bearing a date of Aug. 3, 2001 and printed on Jan. 3, 2008; pp. 1-3; located at http://www.anomalies-unlimited.com/Chemtrails/Dyn-O-Gel.html.

(Continued)

*Primary Examiner* — Joseph Drodge (57) ABSTRACT

A system for altering water properties in an outdoor body of water includes a holding vessel configured to hold water. The holding vessel has at least one wall extending above a mean surface water level. The system also includes at least one conduit extending downward from the holding vessel. The at least one conduit has a length extending to a depth at which at least one property of water at the depth differs substantially from that of water at the surface. The system further includes at least one aperture formed in at least one of the holding vessel or the at least one conduit and located at a distance below the mean surface water level. Further still, the system includes at least one one way valve coupled to the at least one aperture and allowing flow of water in only one direction.

39 Claims, 8 Drawing Sheets

(56) References Cited

U.S. PATENT DOCUMENTS

| | | | |
|---|---|---|---|
| 3,683,627 A * | 8/1972 | Girden | 405/52 |
| 3,688,770 A | 9/1972 | O'Neill | |
| 3,701,262 A | 10/1972 | Connell et al. | |
| 3,732,918 A | 5/1973 | Culbertson | |
| 3,939,356 A * | 2/1976 | Loane | 290/52 |
| 4,051,810 A | 10/1977 | Breit | |
| 4,152,895 A | 5/1979 | Wirt | |
| 4,254,626 A | 3/1981 | Anderson | |
| 4,255,066 A * | 3/1981 | Mehlum | 405/76 |
| 4,279,127 A * | 7/1981 | Longsworth | 62/77 |
| 4,303,520 A | 12/1981 | Wirt | |
| 4,307,299 A * | 12/1981 | Norton | 290/52 |
| 4,316,361 A * | 2/1982 | Hoar | 60/398 |
| 4,364,691 A * | 12/1982 | Wirt | 405/26 |
| 4,462,211 A * | 7/1984 | Linderfelt | 60/501 |
| 4,466,244 A | 8/1984 | Wu | |
| 4,470,544 A | 9/1984 | Bronicki et al. | |
| 4,662,781 A * | 5/1987 | Tinkler | 405/79 |
| 4,766,539 A | 8/1988 | Fox | |
| 4,914,915 A * | 4/1990 | Linderfelt | 60/502 |
| 4,957,392 A | 9/1990 | Bailard et al. | |
| 5,186,822 A * | 2/1993 | Tzong et al. | 210/122 |
| 5,232,384 A | 8/1993 | Klimovitsky | |
| 5,441,200 A | 8/1995 | Rovella, II | |
| 5,492,274 A * | 2/1996 | Assaf et al. | 239/2.1 |
| 6,315,213 B1 | 11/2001 | Cordani | |
| 6,772,592 B2 * | 8/2004 | Gerber et al. | 60/495 |
| 7,260,549 B2 | 8/2007 | Spielmann et al. | |
| 7,479,708 B1 * | 1/2009 | Sternitzke | 290/53 |
| 7,520,237 B1 * | 4/2009 | Dimov Zhekov | 114/264 |
| 7,536,967 B2 * | 5/2009 | Barber | 114/144 R |
| 7,652,388 B2 * | 1/2010 | Lyatkher | 290/53 |
| 2002/0009338 A1 * | 1/2002 | Blum et al. | 405/303 |
| 2004/0078321 A1 | 4/2004 | Lawrence | |
| 2005/0031417 A1 * | 2/2005 | Hofer et al. | 405/52 |
| 2005/0267827 A1 | 12/2005 | Grant, Jr. et al. | |
| 2005/0288941 A1 | 12/2005 | DuBois et al. | |
| 2006/0233613 A1 * | 10/2006 | Welch et al. | 405/76 |
| 2006/0278154 A1 | 12/2006 | Towley, III et al. | |
| 2007/0048086 A1 * | 3/2007 | Thorsbakken | 405/75 |
| 2007/0084768 A1 * | 4/2007 | Barber | 210/143 |
| 2007/0101921 A1 * | 5/2007 | Goldschmidt | 114/382 |
| 2007/0257126 A1 * | 11/2007 | Vondracek | 239/2.1 |
| 2007/0270057 A1 * | 11/2007 | Feldman et al. | 441/1 |
| 2008/0175728 A1 | 7/2008 | Kithil | |
| 2008/0277492 A1 * | 11/2008 | Cannon | 239/14.1 |
| 2009/0173404 A1 | 7/2009 | Bowers et al. | |
| 2009/0175685 A1 | 7/2009 | Bowers et al. | |

FOREIGN PATENT DOCUMENTS

| | | | |
|---|---|---|---|
| WO | WO 96/00848 | * | 1/1996 |
| WO | WO 2008/069948 A1 | | 6/2008 |

OTHER PUBLICATIONS

Atmocean; "Atmocean.com"; printed on Jan. 3, 2008; p. 1; located at http://www.atmocean.com.

Atmocean; "Upwelling System Animation"; printed on Jan. 3, 2008; p. 1; located at http://www.atmocean.com/upwelling.htm.

Atmocean; "Atmocean Upwelling System: Frequently—Asked Questions"; printed on Jan. 3, 2008; p. 1; located at http://www.atmocean.com/faqs.htm.

Atmocean; "Biological Ocean Sequestration of CO2 Using Atmocean Upwelling"; printed on Jan. 3, 2008; p. 1; located at http://www.atmocean.com/sequestration.htm.

Atmocean; "Downsizing Hurricanes Using Atmocean's Upwelling System"; printed on Jan. 3, 2008; p. 1; located at http://www.atmocean.com/hurricane intensity.htm.

Atmocean; "WHOI Research on Carbon Sequestration—Jul. 5, 2006. From Oceanus—Online"; printed on Jan. 3, 2008; p. 1; located at http://www.atmocean.com/news.htm.

Atmocean; "Oceans 'Twilight Zones' Offer Key to Understanding Climate Change"; printed on Jan. 3, 2008; p. 1; located at http://www.atmocean.com/news2.htm.

Larosa, Richard; "Hurricane Suppression by Sea Surface Cooling"; Systems, Applications and Technology Conference, 2006, LISAT 2006, IEEE Long Island; bearing a date of May 5, 2006 and printed on Jan. 3, 2008; pp. 1-5 [Only Abstract provided]; IEEE; Farmingdale, New York.

Rosenfeld, D. et al.; "Simulation of Hurricane Response to Suppression of Warm Rain by Sub-Micron Aerosols"; Atmos. Chem. Phys.; bearing dates of Apr. 5, 2007, Apr. 26, 2007, Jun. 22, 2007, Jun. 25, 2007 and Jul. 2, 2007; pp. 3411-3424; vol. 7; Copernicus Publications on behalf of the European Geosciences Union.

Soerensen, Dr. Hans Christian; "The EC Wave Dragon project, The first offshore wave energy converter in the world connected to the electricity network"; pp. 1-11; located at http://www.ec.europa.eu/research/energy/pdf/wvdr_sites_en.pdf.

Tedd, James; "Testing, Analysis and Control of Wave Dragon, Wave Energy Converter"; Aalborg University, Department of Civil Engineering Thesis No. 9; bearing a date of Oct. 2007; pp. 1-116; Aalborg University.

PCT International Search Report; International App. No. PCT/US 09/00005; Feb. 23, 2009; pp. 1-2.

PCT International Search Report; International App. No. PCT/US2010/001562; Aug. 30, 2010; pp. 1-3.

* cited by examiner

WATER ALTERATION STRUCTURE AND SYSTEM HAVING BELOW SURFACE VALVES OR WAVE REFLECTORS

CROSS-REFERENCE TO RELATED APPLICATIONS

The present application is a continuation-in-part of the "Related Applications" listed below and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

RELATED APPLICATIONS

For purposes of the USPTO extra-statutory requirements, the present application claims priority to U.S. patent application Ser. No. 12/006,823, entitled WATER ALTERATION STRUCTURE AND SYSTEM, naming Jeffrey A. Bowers, Kenneth G. Caldeira, Alistair K. Chan, William H. Gates, III, Roderick A. Hyde, Muriel Y. Ishikawa, Jordin T. Kare, John Latham, Nathan P. Myhrvold, Stephen H. Salter, Clarence T. Tegreene, Willard H. Wattenburg, Lowell L. Wood, Jr. and Victoria Y. H. Wood as inventors, filed 3 Jan. 2008, which is currently co-pending, or is an application of which a currently co-pending application is entitled to the benefit of the filing date.

For purposes of the USPTO extra-statutory requirements, the present application claims priority to U.S. patent application Ser. No. 12/006,815, entitled WATER ALTERATION STRUCTURE MOVEMENT METHOD AND SYSTEM, naming Jeffrey A. Bowers, Kenneth G. Caldeira, Alistair K. Chan, William H. Gates, III, Roderick A. Hyde, Muriel Y. Ishikawa, Jordin T. Kare, John Latham, Nathan P. Myhrvold, Stephen H. Salter, Clarence T. Tegreene, and Lowell L. Wood, Jr. as inventors, filed 3 Jan. 2008, which is currently co-pending, or is an application of which a currently co-pending application is entitled to the benefit of the filing date.

For purposes of the USPTO extra-statutory requirements, the present application claims priority to U.S. patent application Ser. No. 12/006,805, entitled WATER ALTERATION STRUCTURE APPLICATIONS AND METHODS, naming Jeffrey A. Bowers, Kenneth G. Caldeira, Alistair K. Chan, William H. Gates, III, Roderick A. Hyde, Muriel Y. Ishikawa, Jordin T. Kare, John Latham, Nathan P. Myhrvold, Stephen H. Salter, Clarence T. Tegreene, Willard H. Wattenburg, and Lowell L. Wood, Jr. as inventors, filed 3 Jan. 2008, which is currently co-pending, or is an application of which a currently co-pending application is entitled to the benefit of the filing date.

For purposes of the USPTO extra-statutory requirements, the present application claims priority to U.S. patent application Ser. No. 12/006,804, entitled WATER ALTERATION STRUCTURE RISK MANAGEMENT OR ECOLOGICAL ALTERATION MANAGEMENT SYSTEMS AND METHODS, naming Jeffrey A. Bowers, Kenneth G. Caldeira, Alistair K. Chan, William H. Gates, III, Roderick A. Hyde, Muriel Y. Ishikawa, Jordin T. Kare, John Latham, Nathan P. Myhrvold, Stephen H. Salter, Clarence T. Tegreene, and Lowell L. Wood, Jr. as inventors, filed 3 Jan. 2008, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, *Benefit of Prior-Filed Application*, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

BACKGROUND

The description herein generally relates to the field of alteration of water temperatures and dissolved and particulate matter in bodies of water such as oceans, lakes, rivers, structures capable aiding in the alteration and control of such surface and subsurface water temperatures and compositions as well as of many applications and methods of making and using the same. The description also generally relates to the field of structures for altering the weather conditions for the genesis of and/or the maintenance of a hurricane and/or near-hurricane type weather.

Conventionally, there is a need for structures for applications related to altering water properties such that there is a diminished contrast between near surface waters and waters found at greater depth, such as but not limited to atmospheric management, weather management, hurricane suppression, hurricane prevention, hurricane intensity modulation, hurricane deflection, biological augmentation, biological remediation, etc.

SUMMARY

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer. Also various structural elements may be employed depending on design choices of the system designer.

In one aspect, a system for altering water properties includes a holding vessel configured to hold water, the holding vessel has at least one wall. The at least one wall extends at least above a mean surface water level. At least one conduit extends downward. The at least one conduit has a length extending to a depth at which at least one property of water at the depth differs substantially from that of water at the surface. The system further includes at least one aperture formed in at least one of the holding vessel or the at least one conduit and located at a distance below the mean surface water level and at least one one way valve is coupled to the at least one aperture and allowing flow of water in only one direction.

In another aspect, a system for altering water properties includes a tub portion configured to hold water. The tub portion may be formed as a container having at least one side extending at least above a mean surface water level and the tub portion may be at least partially submerged. At least one conduit extends downward from the tub portion. The at least one conduit may have a length extending to a depth at which at least one property of water at the depth differs substantially from that of water at the surface The system further includes at least one aperture formed in at least one of the tub portion or the at least one conduit and located at a distance below the mean surface water level and at least one one way valve is coupled to the at least one aperture and allowing flow of water in only one direction.

In yet another aspect, a system for altering water properties includes a holding vessel configured to hold water. The holding vessel has at least one wall. The at least one wall extends at least above a mean local surface water level. The system also includes at least one conduit extending downward from the holding vessel. The at least one conduit has a length extending to a depth below the local water surface. Further, the system includes at least one wave reflector. The wave reflector is coupled to at least one of the holding vessel and the at least one conduit, the wave reflector configured to reflect wavefronts toward the holding vessel.

In addition to the foregoing, other system aspects are described in the claims, drawings, and text forming a part of the present disclosure.

In addition to the foregoing, various other method and/or system and/or program product aspects are set forth and described in the teachings such as text (e.g., claims and/or detailed description) and/or drawings of the present disclosure.

The foregoing is a summary and thus contains, by necessity, simplifications, generalizations and omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

The foregoing summary is illustrative only and is not intended to be in any way limiting. In addition to the illustrative aspects, embodiments, and features described above, further aspects, embodiments, and features will become apparent by reference to the drawings and the following detailed description, of which.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.). Further, those skilled in the art will recognize that the mechanical structures disclosed are exemplary structures and many other forms and materials may be employed in constructing such structures.

The need for mechanisms, devices, methods, systems, and structures which may be used to alter hurricanes either in their strength, their origin, or their direction of travel has been realized. Billions of dollars of destruction and damage is regularly attributable to hurricanes and hurricane-like tropical storms. Thus, great interest has arisen in controlling these powerful storms. Conventionally, it has been proposed to deploy barges equipped with upward-pointing jet engines into the paths of hurricanes. The jet engines would theoretically be configured to create mini-cyclones which would consume oceanic energy and thus prevent or suppress such high powered weather systems.

Another potential solution involves the use of Dyn-O-Gel, a polymer that may absorb as much as 1,500 times its own weight in water to deprive a hurricane of atmospheric moisture. The concept involves the use of airplanes to drop Dyno-O-Gel into hurricanes to deprive them of moisture and thus of latent heat. The powder is suggested to convert into a gel when the atmospheric moisture is captured and would then reliquify when it encounters higher-osmolality ocean water.

The jet engine solution has been met with great skepticism and the cost and feasibility are very uncertain. The use of a moisture absorbing gel requires the deployment of a huge volume of the absorbing gel material. Also, the use of a moisture absorbing material is still in the testing phase. The gel material after absorbing moisture falls to the ocean and may dissolve. Depending on the chemical composition of the gel, the gel be regarded as a pollutant. These various shortcomings considered, it may be desirable to provide a different approach for altering hurricane and/or tropical storm activity by providing a structure and method that solves at least one or more deficiencies of other systems known in the art. Because hurricanes and other tropical storms derive their energy from warm ocean water, it is logical to harness the great energies of the Earth's fluid envelopes to suppress or alter hurricanes or other tropical storms, and/or to employ the powers of motion within these envelopes over long time-intervals to modulate at least one property of an envelope that is exploited over much shorter time-scales and/or much more limited spatial scales for energizing a hurricane.

A potential solution for cooling warm surface water has been explored by researchers with Atmocean, Inc. of Santa Fe, N.Mex. In the Atmocean approach, an elongated tube with a buoy is used to create an upwelling effect. The upwelling effect drives cold water from a depth to the surface.

It is well known that a hurricane's primary energy source is the release of the heat of condensation of water vapor condensing at high altitudes, with solar-derived heat being the initial source for evaporation. Therefore, a hurricane may be seen as a giant vertical heat engine, albeit one dependent upon mass supplied by largely horizontal flows. Water condensation leads to higher wind speeds, as a fraction of the released energy is converted immediately into thermal energy and thence into mechanical energy, the faster winds and lower pressures associated with them in turn cause increased surface evaporation and thus even more subsequent condensation. Much of the released energy drives updrafts that increase the height of speeding up condensation. This gives rise to factors that provide the system with enough energy to be self-sustaining, and result in a positive feedback loop that continues as long as the tropical cyclone can draw energy from a thermal reservoir and isn't excessively sheared along its vertical extent. In this case, the heat source is the warm water at the surface of the ocean. Without this thermal reservoir to support it a hurricane or other similar storm will not commence, will be weaker, or will die out as the positive feedback loop diminishes to sub-threshold levels or never gets above them.

Figure 1:
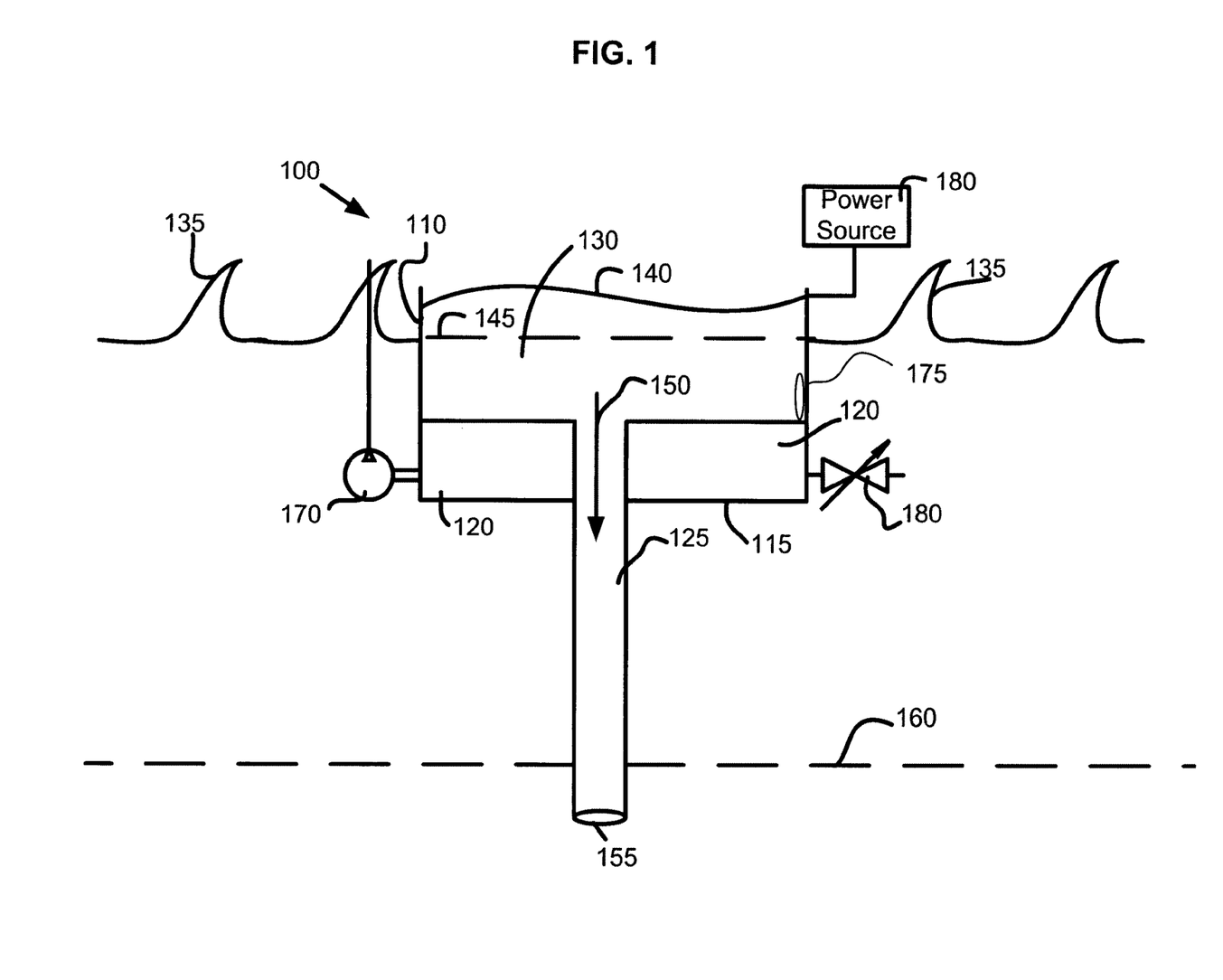
FIG. 1 is an exemplary diagram of a generalized vessel for holding and moving water.

Referring now to FIG. 1, a cross-section of a water-borne structure or vessel 100 is depicted. Vessel 100 is a tub-like structure having one or more walls 110 and a bottom 115. Vessel 100 may be held buoyant in the water by one or more buoyancy tanks 120 which may be used to maintain the buoyancy of vessel 100 and further may be used to control the height of walls 110 above the water level. Vessel 100 also includes a conduit 125 whose horizontal cross section is substantially smaller than the horizontal cross section of the tub portion 130 of the vessel defined by walls 110. In an exemplary embodiment, conduit 125 extends well below the ocean surface including depths below the ocean's thermocline.

In most circumstances, most of the sunlight impinging on the ocean surface is absorbed in the surface layer. The surface layer therefore heats up. Wind and waves move water in this surface layer which distributes heat within it. The temperature may therefore be reasonably uniform to depths extending a few hundred feet down from the ocean surface. Below this mixed layer, however, the temperature decreases rapidly with depth, for example, as much as 20 degrees Celsius with an additional 150 m (500 ft) of depth. This area of rapid transition is called the thermocline. Below it, the temperature continues to decrease with depth, but far more gradually. In the Earth's oceans, approximately 90% of the mass of water is below the thermocline. This deep ocean consists of layers of substantially equal density, being poorly mixed, and may be as cold as −2 to 3° C.

Therefore, the lower depths of the ocean may be used as a huge heat/energy sink which may be exploited by vessel 100. When vessel 100 is deployed at sea, waves 135 may lap over the top of walls 110 to input warm (relative to deeper waters) surface ocean water into tub 130. Tub 130 will fill to a level 140 which is above the average ocean level depicted as level 145. Because of the difference between levels 140 and 145, a pressure head is created thereby pushing warm surface ocean water in a downward direction 150 down through conduit 125 to exit into the cold ocean depths (relative to near surface waters) through one or more openings 155. In an exemplary embodiment, the depth of opening 155 may be located below the ocean's thermocline, the approximate bottom of which is depicted as line 160. This cycle will be continuous in bringing warm surface ocean water to great depth as ocean waves continue to input water into tub 130.

Figure 2:
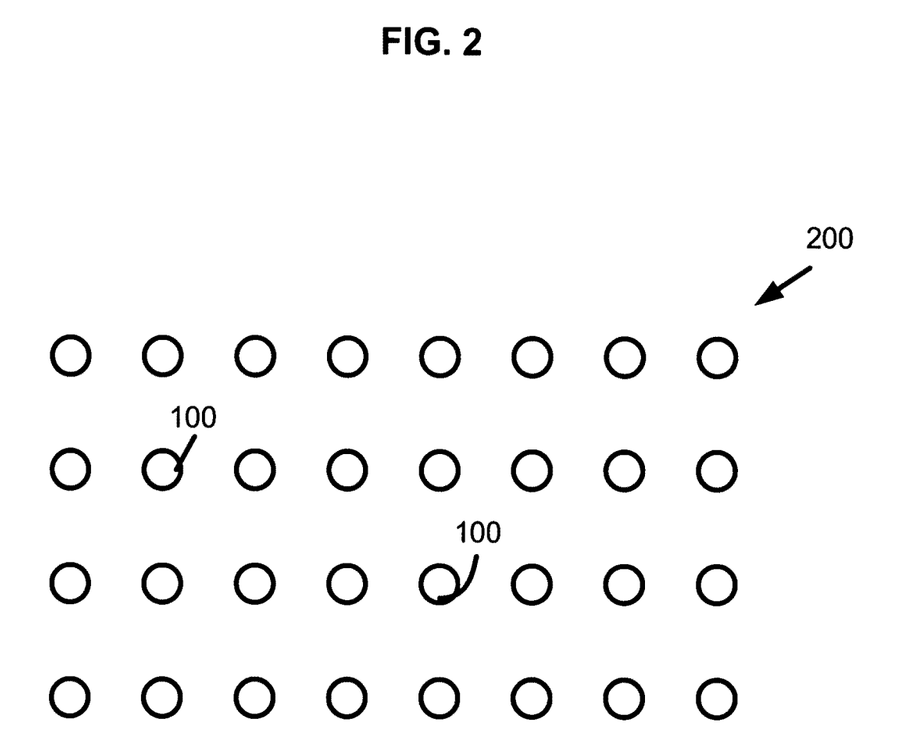
FIG. 2 is an exemplary diagram of a pattern of deployment of a plurality of vessels similar to that of FIG. 1.
Figure 3:
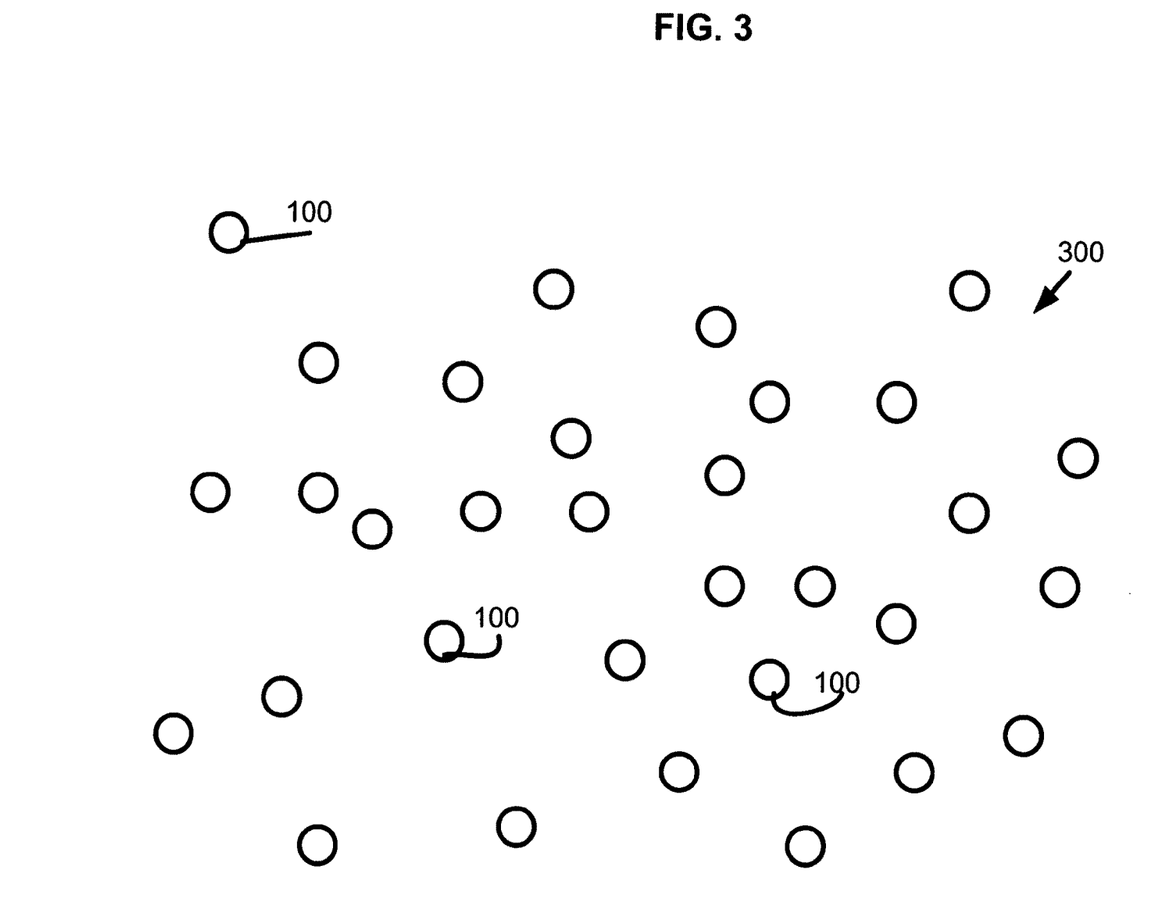
FIG. 3 is another exemplary diagram of a pattern of deployment of a plurality of vessels similar to that of FIG. 1.
Figure 5:
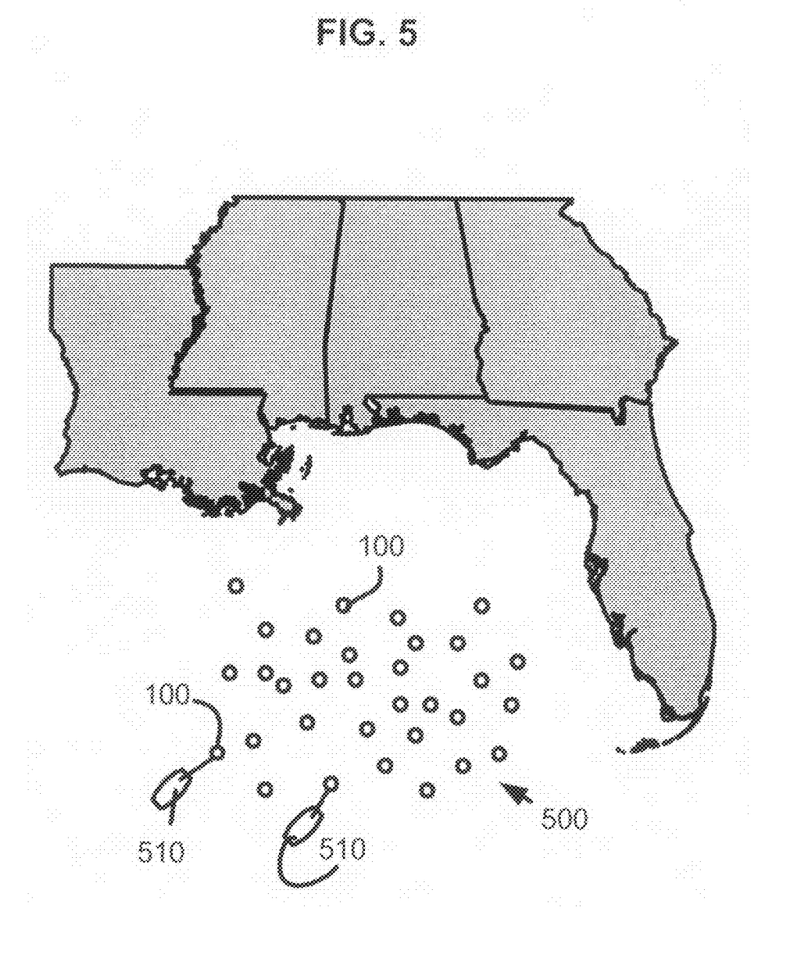
FIG. 5 is a simplified depiction of a deployment of a plurality of vessels such as those depicted in FIG. 1 in a geographic region, the simplified depiction not intended to imply any specific scale and the depiction of the vessels and watercraft not drawn to scale.

If many of vessel 100 are distributed throughout a region of water, the temperature of the surface of the water may be altered. Referring to FIG. 2, an array 200 of vessels 100 is depicted. Such vessels may be arranged in a plurality of ways, including but not limited to positioning them in a water region in an array, such as array 200, in a random placement 300, as depicted in FIG. 3, within a region, and/or in any other arrangement. It may be desirable to determine the most suitable and/or optimal arrangements through computer modeling or other techniques. Referring now to FIG. 5, it may be seen that many vessels 100 may be dispersed throughout hurricane prone regions such as but not limited to the Gulf of Mexico 500 or the Caribbean Sea. Vessels 100, depicted for illustrative purposes only and not to scale are shown being dispersed in a relatively random pattern. Boats 510 may be used to tow vessels to desired locations. Also, other means such as self propulsion, airlifting, towing, or other methods to move vessels may also be used. In another embodiment, vessels 100 may be anchored in a variety of ways, including but not limited to anchored to the bottom, anchored using subsurface weights, anchored using sea anchors, or anchored to each other.

Referring again to FIG. 1 vessel 100 may be one vessel in a system for altering water surface temperature. As such the tub 130 is one type of a holding vessel configured to hold water. Tub 130 includes at least one wall 110 (but may include multiple walls) which are coupled to a bottom portion 115. The at least one wall 110 extends above the water level and the bottom portion 115 is configured to be submerged. At least one conduit 125 extends from the bottom of the tub 130. In some, but not necessarily all, applications, it may be desirable for conduit 125 to have a length that extends to a depth at which the temperature of water at the depth (e.g., below line 160) is substantially less than water at the surface Vessel 100 may be held buoyant by both the materials used to construct vessel 100 as well as at least one ballast tank 120. Tanks 120 may be coupled to at least one pump 170 and at least one valve 180. In accordance with an exemplary embodiment, the height of wall 110 above the average water surface level may be varied and controlled depending on the time-varying height of the local waves and depending on the desired flow rate through conduit 125. One way in which to vary the height of wall 110 above the average water level 145 is to pump atmospheric air into tank 120 or out of tank 120. In conjunction with pump 170, valve 180 may be used to draw water into or out of tanks 120. In accordance with another exemplary embodiment, it may be desirable to have the ability to mechanically raise or lower at least a portion of wall 110 relative to the rest of the structure. It may also be desirable to control the raising and lowering of all or part of wall 110 in response to conditions adjacent to vessel 100 (e.g., water temperature, wave height).

In another embodiment, water flow into vessel 100 may be via openings 175 in wall 110, rather than over the top of wall 110. Such openings may be configured to preferentially allow flow into vessel 100, instead of out of the vessel. In some embodiments, openings 175 are passive, using flaps, checkvalves, rotating drums, or similar mechanisms to support unidirectional flow. In other embodiments, openings 175 are actively controlled, utilizing motorized or variable setpoint flow control devices such as valves, flaps, rotating drums, or similar mechanisms.

Walls 110 and bottom portion 115 as well as other parts of vessel 100 may be constructed of any of a variety of materials and preferably of a material substantially resistant to degradation in water. For example, vessel 110 may be substantially constructed from concrete, polymers, at least one of metals or metal alloys, fabrics, reinforced fabrics, and/or composite materials. In some applications, it may be advantageous for the construction materials to resist degradation only for a limited period of time, as degradation of the structure may diminish or eliminate expenditures associated with post-application retrieval of the structure. Furthermore, it may be advantageous to allow the structure to sink below the water surface or to the water bottom after application, where degradation may be preferred to occur. In an exemplary embodiment, conduit 125 may be formed of any of a variety of materials including both rigid materials and flexible materials. It may also be desirable to use stiffening structures in the conduit depending on the type of materials used. Such stiffening structures aid in maintaining the shape of conduit 125 under pressure and under stress. The stiffening structures may be placed at one or more locations along the length of the conduit. Further, such stiffening structures may be deployable and may aid in deployment along with a conduit which may also be deployable from tub 130. In yet another exemplary embodiment, it may be desirable to form vessel 100 from a material which would be known to degrade over time. This may be useful if it is known that a vessel has a desired lifespan or term of usefulness. Once the vessel's use is done, the vessel could sink or be sunk where it could subsequently degrade at a subsurface location.

In an exemplary embodiment the holding vessel or tub 110 has a horizontal cross sectional dimension that is substantially greater than a horizontal cross sectional dimension of the conduit 125. In another exemplary embodiment holding vessel or tub 100 has a horizontal cross sectional dimension and/or shape that is substantially the same as the cross sectional dimension and/or shape as conduit 125. The pressure head created by the weight of the column of water above the conduit which is above the line 145 is used to pressurize the descending water in conduit 125. In an exemplary embodiment it may be convenient to have a power source 190 on board vessel 100. Power source 190 may be any of a variety of power sources, including but not limited to a solar cell, a wind generator, a wave power generator, a turbine turned by water descending in the conduit, a battery power source, a fuel powered power source, a thermoelectric power source, etc.

Figure 6:
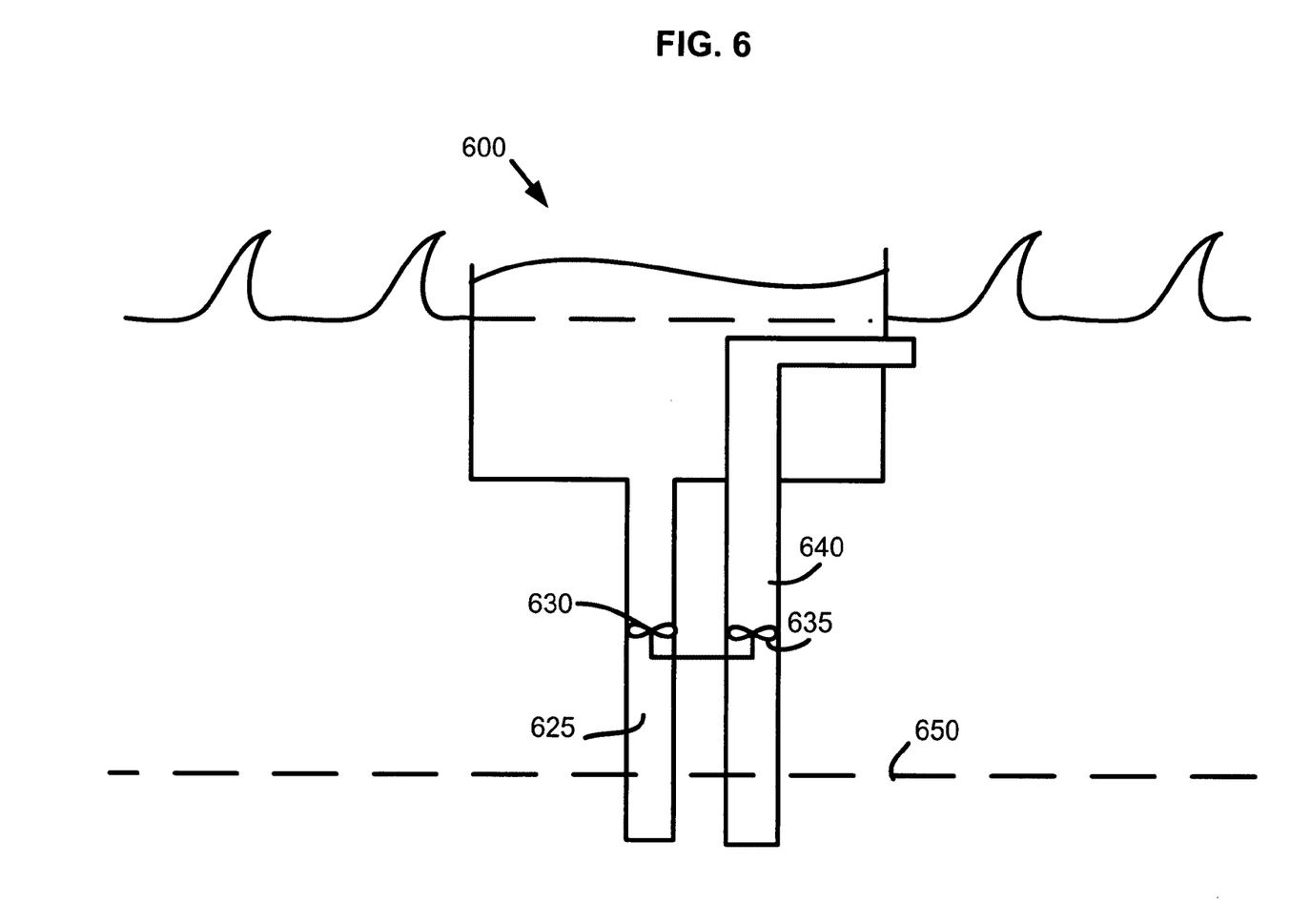
FIG. 6 is an exemplary block diagram of a generalized vessel for holding and moving water having an auxiliary conduit.

In accordance with an embodiment a vessel 600 is depicted in FIG. 6 having a conduit 625. Disposed within conduit 625 is a turbine 630. Turbine 630 may be driven by the flow of water through conduit 625. Turbine 630 may be utilized for a variety of purposes including but not limited to generating power for a variety of purposes, maintaining buoyancy, controlling buoyancy, driving other turbines, increasing the water flow through conduit 625, etc.

Figure 4:
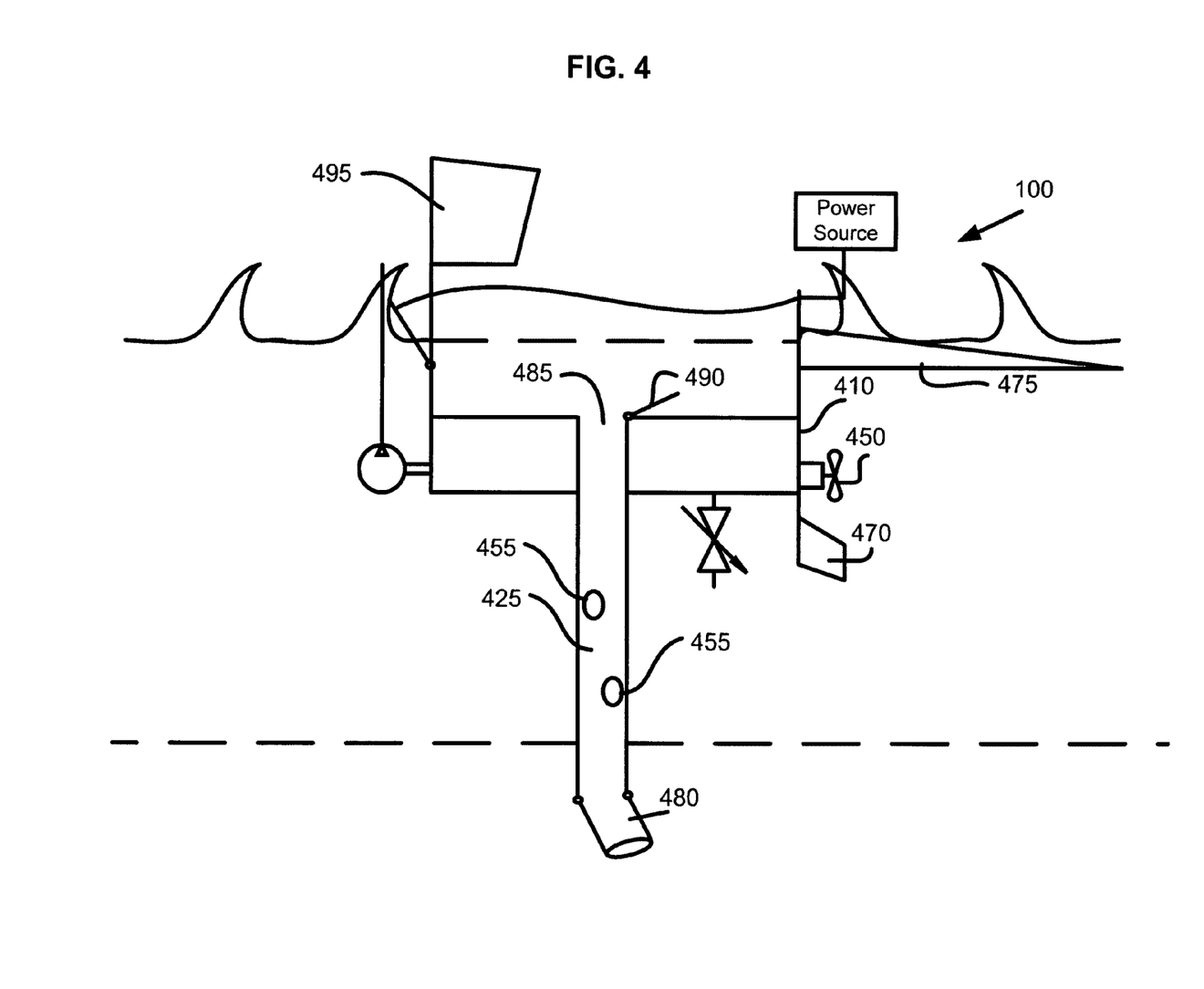
FIG. 4 is an exemplary diagram of a generalized vessel for holding and moving water and depicting on-board propulsive devices.

In accordance with other exemplary embodiments it may be desirable to equip vessel 100 with one or more propulsion systems. Referring now to FIG. 4, a propulsion system may be in the form of a sail or a propeller 450 or other motorized propulsion producing device. Such a propulsive device may be powered by power source 460 or any other source of power. The propulsion system may be used to control the positioning of vessel 100 such that it remains at a specific area, moves in a specific pattern, and/or moves to a completely new location. A rudder 470, fin, sail, or other steering device may be coupled to vessel 100 to help guide vessel 100. Alternatively, a sail or a propeller 450 may be configured to change orientation to provide steering for vessel 100.

Because different depths in bodies of water often have currents flowing in different directions or with different speeds, a propulsion system may involve the use of one or more sea anchors with mechanisms and control systems to effect proper placement of the sea anchors. In one exemplary embodiment, it may be desirable to construct vessel 100 with a shape such that its coefficient of drag is less in one direction than another. This may be accomplished by making the dimensions of vessel 100 longer in one direction than another, for example. Other methods and shapes may also be used to produce such an effect.

In accordance with another exemplary embodiment, vessel 100 may include a movable conduit in which at least a portion 480 of conduit 425 may be movable in various directions in order to provide a propulsive force in a desired direction. In another exemplary embodiment, the movable portion may be one or more openings 455 which may be controlled, along the length of conduit 425. The propulsive force generated by water flow through conduit 425 may also be varied by opening and closing opening 485 using a controlled access device such as door 490 (or other aperture control devices such as but not limited to valves, etc.) that may control the flow rate through conduit 425.

In an exemplary embodiment walls 410 of vessel 100 may be formed of multiple wall segments or multiple wall portions. The multiple wall segments of walls 410 form a closed shape to contain water within vessel 100. The wall segments may be curved or straight, may be movable in such a way as to help let in water or alternatively to release water. In one exemplary embodiment, vessel 100 may be permanently anchored to the water floor, temporarily anchored to the water floor, tied to a subsurface weight, tied to one or more sea-anchors, or may be freely movable. In one exemplary embodiment, vessel 100 is movable by coupling the vessel to a propulsive vessel, such as a tugboat or the like. In another exemplary embodiment, vessel 100 may include a wind capture structure, such as a sail 495 that may be used to harness wind power for moving the holding vessel. The wind capture structure may be used for controlling the amount that the at least one wall of the holding vessel extends above the water, that is it may also be used to provide lift to the holding vessel 100 structure, to help control how far above the water level that walls 410 extend. Sea anchors are functionally similar to sails, except instead of extending up into the atmosphere they are deployed into the water. Thus, sea anchors or current capture structures may be used for similar purposes as sails and wind capture structures. These include moving or holding the vehicle, generating power, providing lift, etc. Also in an exemplary embodiment, vessel 100 may have a ramp area 475 or other wave altering area that helps to control how the waves move water over the sides of vessel 100. This wave-altering structure may be a static or passive structure, or it may be an active device or structure having one or more components that are actuated or powered in order to have a time-dependent character or activity; the power for such purposes may be derived from any of the power-providing means discussed above, or may be derived from the wave-action itself. Further, in an exemplary embodiment, vessel 100 may have any of a variety of shapes including but not limited to circular, elongated, non-circular, shaped in a manner which aids in passively controlling orientation relative to wave motion, etc.

Referring now to FIG. 6, a vessel 600 is depicted. Vessel 600 includes a conduit 625 in which a turbine 630 is driven by the downward flow of water through conduit 625. In an exemplary embodiment, the turning turbine may be used for a variety of purposes including providing electric or mechanical power, providing control, providing propulsive power, etc. In one exemplary embodiment a secondary conduit 640 (which represents one or more conduits) may be used to bring cold water (such as below an ocean thermocline 650) to upper areas of warmer surface water to aid in cooling the warm surface water regions, enhance mixing of subsurface water with surface water, enhance mixing of surface water with subsurface water, raising subsurface nutrients to the surface, bringing surface nutrients to subsurface regions, etc. In one exemplary embodiment, turbine 630 may be used to drive a second turbine 635 in conduit 640 that pumps water up through conduit 640. Further, other mechanisms may be used to bring subsurface water upwards. In most places, deeper waters contain a greater concentration of nutrients than surface water, so conduit 640 may also be used to transport dissolved nutrients from deeper waters to waters near the surface of the body of water.

Figure 7:
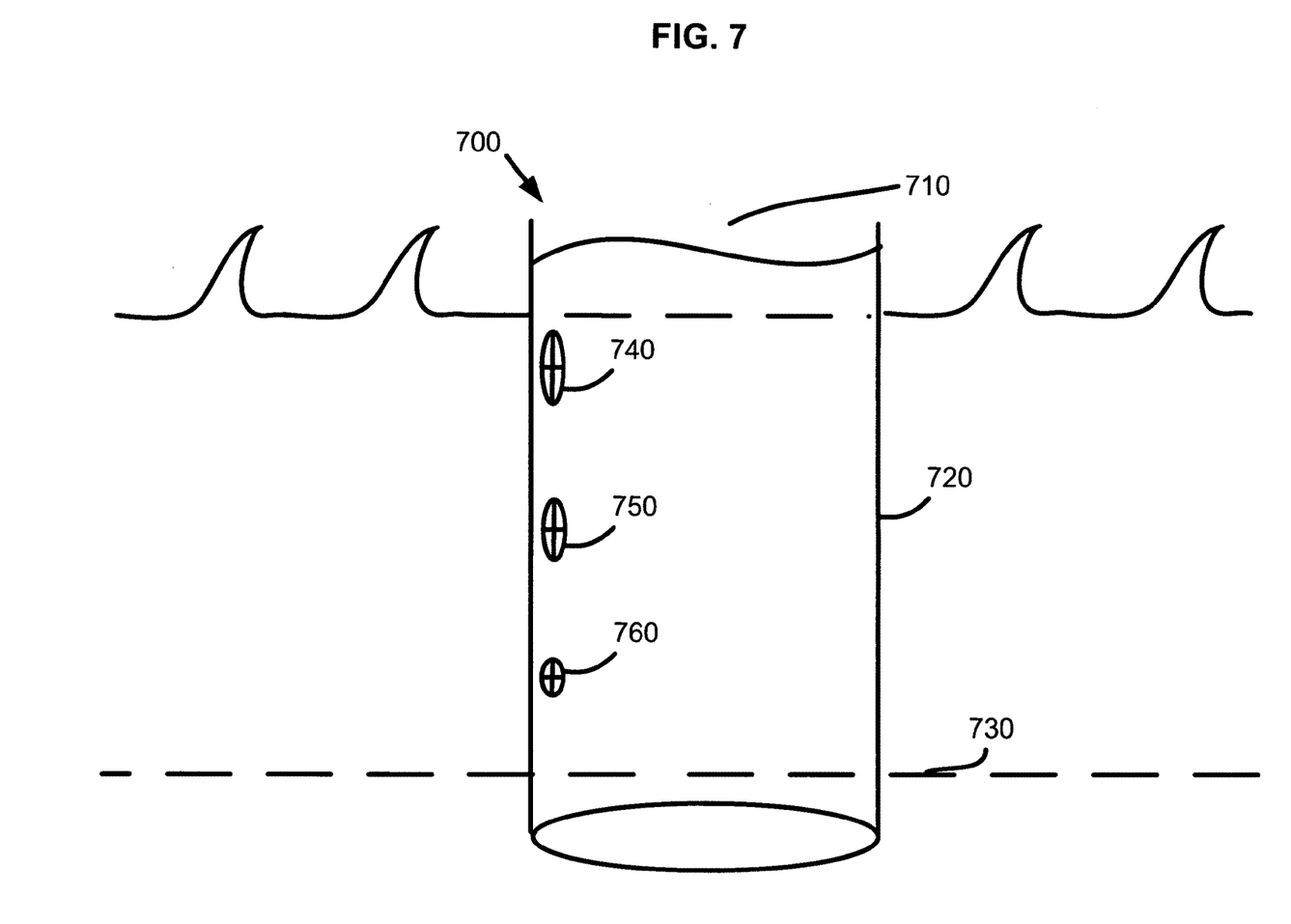
FIG. 7 is an alternative exemplary diagram of a generalized vessel for holding and moving water.

It may be desirable to construct a vessel such as vessel 100 of FIG. 1, in a variety of shapes and configurations depending on the use and on the desired performance characteristics. Referring to FIG. 7, an alternative exemplary embodiment of a vessel 700 is depicted in the form of an elongate tube that is designed to capture water at its top 710 and thereby develop a pressure head (as described earlier) to push surface water to subsurface levels. Walls 720 may form the structure without a bottom portion or a tub portion as shown in other exemplary embodiments. Walls 720 may be formed of any of a variety of materials as also described earlier. Water may be carried to any of a variety of subsurface levels depending on the design and desired performance, including but not limited to below thermocline 730. Alternatively, vessel 700 may capture water entering through one or more apertures at subsurface levels such as one way apertures 740, 750, and 760. One way apertures 740, 750, and 760 may include passive or active valves depending upon the desired performance or operating characteristics desired. In one embodiment, apertures 740, 750, and 760 may be designed to let in water based on specific conditions such as but not limited to changes in pressure, changes in temperature, etc. In accordance with another exemplary embodiment, apertures 740, 750, and 760 may vary in size. Such variance may be actively controlled or alternatively the variance in size may be built in such that the variance is based on the distance from the top of vessel. Further the distribution of apertures may be uniform over the outer or inner surface of the vessel or may vary depending on design considerations. Apertures 740, 750, and 760 may include any of a variety of types of valves/devices including various types of flap valves, stop valves, check valves, gate valves, paddle wheels, one-way permeable membranes, convoluted tubes, etc. In an exemplary embodiment apertures 740, 750, and 760 may include one way valves that let water flow into the interior of vessel 700 and thereby contributing to the flow through vessel 700. Further, apertures 740, 750, and 760 may be controlled such that they are able to selectively let water in or let water flow out of vessel 700.

In accordance with a particular exemplary embodiment, the configuration of vessel 700 may include a hollow cylindrical floating enclosure approximately 90 meters in diameter and 20 meters deep, these dimensions being for example and not limiting. Buoyancy may be provided by an inflated ring or foam rings with a low freeboard which may or may not be independent of vessel 700. The cylindrical surface may include a continuous wall of non-return (one way) valves (e.g. valves 740, 750, and 760). Below this is a tube made of a plastic, met-glass, carbon fiber, etc. with slightly negative buoyancy long enough to reach down to the thermocline. Water can flow into the cylinder with very little resistance but cannot flow back through the valve wall. This will initially raise a head inside the cylinder which would be similar in magnitude to the amplitude of each incoming wave. But as soon as the head exceeds that needed to overcome the difference in density between the warm surface and the cold water below the thermocline, water will start to flow downwards. The head needed for a surface temperature of 25° C., constant down to a depth of 200 meters followed by a drop to 10 C at the thermocline may be approximately 0.14 meters. The inertia of the water column inside the down-tube may be large such that the velocity will be almost steady and water will be sucked into the cylinder during any lull of the incoming waves.

Generally, horizontal displacements of long period waves will go deeper than short period waves but short period waves do their displacing more often. The transfer rates for all periods between 6 and 10 second may be nearly the same for valve wall depths of 15 to 20 meters. For a 20 meter wall depth the flow volume would be about 2.8 cubic meters per second for each meter width of installation and each meter amplitude of the incoming wave. For example, in a one-meter amplitude regular wave this would be about 250 cubic meters per second for a 90 meter diameter unit. The thermal energy transfer would be this flow rate times the specific heat of water (4.28 MJ per cubic meter Kelvin) times the temperature difference of 15 C. This comes out to approximately 16 GW. Although these rates, sizes, and energy calculations are provided, the claims should not be viewed as so limiting. In fact these rates, times, and energies are provided merely for example.

It has been shown that in addition to the drag from any currents there may also be a large force due to the momentum of waves which depends on the square of incident plus reflected minus transmitted amplitudes. Vessels 700 and like vessels may not have a firm attachment points for a mooring. Because nearly all ocean systems consist of gyres it may be possible to let vessels 700 or like vessels to drift freely but to release the water in a direction to produce a controlled amount of thrust towards the center of the local gyre as discussed above. In one exemplary embodiment, the walls having valves 740, 750, and 760 may be slightly elastic or resilient in nature. By providing such elastic walls, a negative head may be developed locally with the period of each incoming wave. Such elastic walls may be formed of but are not limited to being formed of polycarbonate or certain plastics which may have a desired elastic response.

In another exemplary embodiment, a cap or top of vessel 700 may be used such that vessel 700 does not rely on wave overtopping to develop a pressure head. Rather, vessel 700 utilizes one way valves 740, 750, and 760 to develop a pressure head by receiving water flow through the valves from the under surface wave motion. In operation water flows through the valves and is forced downward to flow out the bottom of vessel 700. In one exemplary embodiment there may be substantially no pocket of air between the top or cover and the ocean surface. In another exemplary embodiment there may be a pocket of air between the top or cover and the ocean surface, which when water is forced into vessel 700, may cause the air to become pressurized and thereby aid in producing downward flow. In one exemplary embodiment, the valves may be nonuniformly distributed on vessel 700. Further, the size, type and other specifications may be adapted to the depth. Some or more of the valves may be dynamic in nature with variable and possibly controllable characteristics. The controllability of the valves may be based on a variety of control algorithms including set points and the like.

Figure 8:
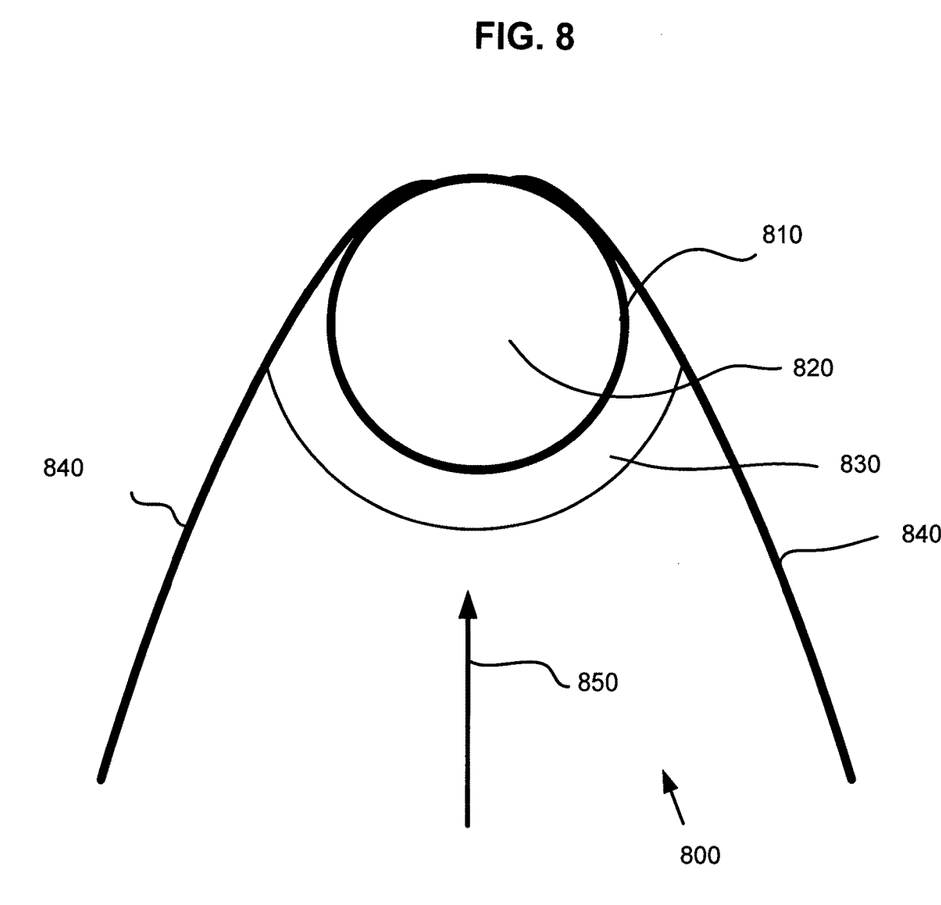
FIG. 8 is a top view of an exemplary generalized vessel for holding and moving water.

Referring now to FIG. 8, a top view of a water alteration vessel 800 is depicted. Vessel 800 includes a water receiving portion defined in an exemplary manner by a cylinder 810. Cylinder 810 having a receiving area 820 which receives overtopping wave water. In one exemplary embodiment, a ramp region 830 helps to aid in bringing water into receiving area 820. Further, in an exemplary embodiment walls 840 which may be partially submerged and partially elevated above a mean surface level may act as wave reflectors or wave concentrators. In operation walls 840 help to concentrate incoming waves, having wavefronts moving for example in the direction 850, so that the waves are more apt to spill over the top of cylinder 810 into receiving area 820. Further, in an exemplary embodiment the orientation of vessel 800 may be controlled such that waves are incident in substantially the direction 850 in order to increase the efficiency with which wave water enters receiving area 820. In one exemplary embodiment, reflectors 840 may be movable. Such movability may be done in a passive or active manner and may be used to increase or decrease the efficiency in which wave water is directed toward holding vessel 810.

The capability of the systems and methods described to enhance mixing between surface and subsurface water can be useful for other applications in addition to/instead of thermally based weather modification. One such application is to aid in ocean uptake of atmospheric $CO_2$. Oceans are natural $CO_2$ sinks, and represent the largest active carbon sink on Earth. This role as a sink for $CO_2$ is driven by two processes, the solubility pump and the biological pump. The former is primarily a function of differential $CO_2$ solubility in seawater and the thermohaline circulation, while the latter is the sum of a series of biological processes that transport carbon (in organic and inorganic forms) from the near-surface euphotic zone to the ocean's interior.

The solubility pump is a nonbiological effect wherein $CO_2$ first dissolves in the surface layer of the ocean. This surface layer can become saturated and its ability to absorb more carbon dioxide declines. Use of this system to promote mixing between surface and subsurface water enhances the efficacy of the solubility pump in at least two manners; by net transport of $CO_2$-enriched water downwards, as well as by reducing the temperature of the surface water, thereby increasing its ability to dissolve $CO_2$. The solubility pump enhancement induced by this system can also be useful for increasing ocean uptake of other atmospheric gases, such as methane, nitrogen oxides, sulfur dioxide, etc.

While the biological pump currently has a limited effect on uptake of $CO_2$ introduced into the atmosphere by human activities, there have been suggestions to increase the carbon sequestration efficiency of the oceans by increasing the surface-layer phytoplankton concentration, which is in many instances limited by insufficient surface-layer nutrients. Nitrates, silicates, and phosphates are, for instance, largely absent from surface waters, yet are considerably more abundant in subsurface oceans. These exemplary systems and methods can be used to mix surface and subsurface waters, thereby transporting nutrients towards the surface. This increase in surface nutrients can be useful in increasing the $CO_2$ biological pump by increasing surface-layer phytoplankton concentrations. Increases in surface-layer nutrients can also be useful for increasing populations of water-based fauna or flora, both in oceans and in other water bodies, such as lakes, reservoirs, rivers, etc.

The benefits of these systems and methods in increasing mixing between surface and subsurface water is not restricted to use in oceans, but can also be beneficial in other bodies of water, such as lakes, reservoirs, rivers, etc.

In a general sense, those skilled in the art will recognize that the various embodiments described herein can be implemented, individually and/or collectively, by various types of electromechanical systems having a wide range of electrical components such as hardware, software, firmware, or virtually any combination thereof, and a wide range of components that may impart mechanical force or motion such as rigid bodies, spring or torsional bodies, hydraulics, and electrically, magnetically or electromagnetically actuated devices, or virtually any combination thereof. Consequently, as used herein "electromechanical system" includes, but is not limited to, electrical circuitry operably coupled with a transducer (e.g., an actuator, a motor, a piezoelectric crystal, etc.), electrical circuitry having at least one discrete electrical circuit, electrical circuitry having at least one integrated circuit, electrical circuitry having at least one application-specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), electrical circuitry forming a communications device (e.g., a modem, communications switch, or optical-electrical equipment), and any non-electrical analog thereto, such as optical, mechanical, fluidic or other analogs. Those skilled in the art will also appreciate that examples of electromechanical systems include but are not limited to a variety of consumer electronics systems, as well as other systems such as motorized transport systems, factory automation systems, security systems, and communication/computing systems. Those skilled in the art will recognize that electromechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those skilled in the art will recognize that it is common within the art to implement devices and/or processes and/or systems in the fashion(s) set forth herein, and thereafter use engineering and/or business practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, hovercraft, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Quest, Southwestern Bell, etc), or (g) a wired/wireless services entity such as Sprint, Cingular, Nextel, etc.), etc.

One skilled in the art will recognize that the herein described components (e.g., steps), devices, and objects and the discussion accompanying them are used as examples for the sake of conceptual clarity and that various configuration modifications are within the skill of those in the art. Consequently, as used herein, the specific exemplars set forth and the accompanying discussion are intended to be representative of their more general classes. In general, use of any specific exemplar herein is also intended to be representative of its class, and the non-inclusion of such specific components (e.g., steps), devices, and objects herein should not be taken as indicating that limitation is desired.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass Within their scope all such changes and modifications as are within the true spirit and scope of the subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A system for altering water properties in an outdoor body of water, comprising:
    a holding vessel configured to hold water, the holding vessel having at least one wall, the at least one wall extending at least above a mean surface water level, the holding vessel having a buoyancy structure that aids in generally maintaining a top of the holding vessel at a desired height above a mean water surface level, and the holding vessel having a wave alteration structure that aids in causing waves impinging on the holding vessel to overtop the top of the holding vessel and the water being captured within the holding vessel creating a pressure head, the pressure head being based on a difference in height between the water in the vessel and the mean surface water level of the body of water, causing movement of the captured water in a downward direction;
    at least one conduit extending downward from the holding vessel and containing the downward water movement, the at least one conduit having a length extending to a depth at which at least one property of water at the depth differs substantially from that of water at the surface the at least one conduit having an outlet at the depth;
    at least one aperture formed in at least one of the holding vessel or the at least one conduit and located at a distance below the mean surface water level the at least one aperture separate from the outlet; and
    at least one one way valve coupled to the at least one aperture and allowing flow of water into the interior of the holding vessel or the interior of the conduit.

2. The system of claim 1, wherein the wall also forms the conduit.

3. The system of claim 1, wherein the conduit has substantially the same cross sectional area as the cross sectional area of the holding vessel that extends above the water.

4. The system of claim 1, wherein the conduit has a larger cross sectional area than the cross sectional area of the holding vessel that extends above the water.

5. The system of claim 1, wherein the conduit has a smaller cross sectional area than the cross sectional area of the holding vessel that extends above the water.

6. The system of claim 1, wherein the conduit extends to at least the depth of the thermocline.

7. The system of claim 1, wherein the properties being altered comprise at least one of, water temperature, dissolved-gas concentration, water chemical composition or water biological composition.

8. The system of claim 1, wherein the system is used to influence biological activity.

9. The system of claim 1, wherein the at least one apertures are distributed around at least one of the at least one conduit or the holding vessel.

10. The system of claim 1, wherein the at least one apertures are distributed at various depths on at least one of the at least one conduit or the holding vessel.

11. The system of claim 1, wherein the at least one apertures are distributed at various depths on at least one of the at least one conduit or the holding vessel and the size of the apertures are based on the depth.

12. The system of claim 1, wherein the at least one apertures are distributed at various depths on at least one of the at least one conduit or the holding vessel and the distribution is based on the depth.

13. The system of claim 1, wherein the at least one one way valves allow the flow of water into the at least one conduit or the holding vessel.

14. The system of claim 1, wherein the at least one one way valves are selectively changeable such that the one way valves can be configured to allow flow in a chosen direction.

15. The system of claim 1, wherein the at least one valves include passive valves.

16. The system of claim 1, wherein the at least on valves include flap valves.

17. The system of claim 1, further comprising:
    at least one wave reflector, the wave reflector coupled to at least one of the holding vessel and the at least one conduit, the wave reflector configured to reflect wavefronts toward the holding vessel.

18. The system of claim 1, further comprising a top coupled to the holding vessel, the top preventing the in flow of water by overtopping.

19. A system for altering water properties of an outdoor body of water, comprising:
a tub portion configured to hold water, the tub portion formed as a container having at least one side extending at least above a mean surface water level and the tub portion being at least partially submerged and the tub portion having a wave alteration structure that aids in causing waves impinging on the tub portion to overtop the top of the tub portion and the water being captured within the tub portion creating a pressure head, the pressure head being based on a difference in height between the water in the tub portion and the mean surface water level of the body of water, causing movement of the captured water in a downward direction;
a buoyancy structure coupled to the tub portion, the buoyancy structure generally maintaining a top of the at least one side at a desired height above the mean surface water level;
at least one conduit extending downward from the tub portion and containing the downward water movement, the at least one conduit having a length extending to a depth at which at least one property of water at the depth differs substantially from that of water at the surface the at least one conduit having an outlet at the depth;
a sea anchor coupled to at least one of the tub portion or the at least one conduit, the sea anchor aiding to substantially maintain the system at a location in the outdoor body of water;
at least one aperture formed in at least one of the tub portion or the at least one conduit and located at a distance below the mean surface water level the at least one aperture separate from the outlet; and
at least one one way valve coupled to the at least one aperture and allowing flow of water into the interior of the tub portion or the interior of the conduit.

20. The system of claim 19, wherein the side also forms the conduit.

21. The system of claim 19, wherein the conduit includes one or more openings located at preferred depths.

22. The system of claim 19, wherein the conduit comprises multiple openings distributed over an area to effect, at depth, rapid dilution of outflow water with ambient water.

23. The system of claim 19, wherein the properties being altered comprise at least one of, water temperature, dissolved-gas concentration, water chemical composition or water biological composition.

24. The system of claim 19, wherein at least one of the tub portion or the conduit contains at least one internal structure that is configured to maintain a desired cross sectional shape or condition in at least a portion of the tub portion or conduit.

25. The system of claim 19, wherein at least one of the tub portion or the conduit has a cross sectional shape that is configured to reduce drag when moving relative to the water.

26. The system of claim 19, wherein at least part of the vessel wall has openings.

27. The system of claim 19, wherein at least part of the vessel wall has openings and the openings are configured to allow water to flow substantially in only one direction.

28. The system of claim 19, wherein the system is used to influence biological activity.

29. The system of claim 19, wherein at least part of the tub portion has openings and the openings are controllable.

30. The system of claim 19, wherein the at least one apertures are distributed around at least one of the at least one conduit or the holding vessel.

31. The system of claim 19, wherein the at least one apertures are distributed at various depths on at least one of the at least one conduit or the holding vessel.

32. The system of claim 19, wherein the at least one apertures are distributed at various depths on at least one of the at least one conduit or the holding vessel and the size of the apertures are based on the depth.

33. The system of claim 19, wherein the at least one apertures are distributed at various depths on at least one of the at least one conduit or the holding vessel and the distribution is based on the depth.

34. The system of claim 19, wherein the at least one one way valves allow the flow of water into the at least one conduit or the holding vessel.

35. The system of claim 19, wherein the at least one one way valves are selectively changeable such that the one way valves can be configured to allow flow in a chosen direction.

36. The system of claim 19, wherein the at least one valves include passive valves.

37. The system of claim 19, wherein the at least on valves include flap valves.

38. The system of claim 19, further comprising:
at least one wave reflector, the wave reflector coupled to at least one of the tub portion and the at least one conduit, the wave reflector configured to reflect wavefronts toward the tub portion.

39. The system of claim 19, further comprising
a top coupled to the holding vessel, the top preventing the in flow of water by overtopping.

* * * * *

UNITED STATES PATENT AND TRADEMARK OFFICE
CERTIFICATE OF CORRECTION

PATENT NO.        : 8,715,496 B2
APPLICATION NO.   : 12/012225
DATED             : May 6, 2014
INVENTOR(S)       : Jeffrey A. Bowers et al.

Page 1 of 1

It is certified that error appears in the above-identified patent and that said Letters Patent is hereby corrected as shown below:

In the Claims

Column 18, Line 39, Claim 37:
"wherein the at least on valve" should read --wherein the at least one valve--

Signed and Sealed this
Eighth Day of July, 2014

Michelle K. Lee
*Deputy Director of the United States Patent and Trademark Office*